US009892089B2

(12) United States Patent
Felicijan

(10) Patent No.: US 9,892,089 B2
(45) Date of Patent: Feb. 13, 2018

(54) ARITHMETIC LOGICAL UNIT ARRAY, MICROPROCESSOR, AND METHOD FOR DRIVING AN ARITHMETIC LOGICAL UNIT ARRAY

(71) Applicant: Infineon Technologies AG, Neubiberg (DE)

(72) Inventor: Tomaz Felicijan, Graz (AT)

(73) Assignee: Infineon Technologies AG, Neubiberg (DE)

( * ) Notice: Subject to any disclaimer, the term of this patent is extended or adjusted under 35 U.S.C. 154(b) by 742 days.

(21) Appl. No.: 14/146,747

(22) Filed: Jan. 3, 2014

(65) Prior Publication Data
US 2015/0193235 A1    Jul. 9, 2015

(51) Int. Cl.
| | |
|---|---|
| *G06F 9/00* | (2006.01) |
| *G06F 15/80* | (2006.01) |
| *G06F 9/38* | (2006.01) |
| *G06F 21/60* | (2013.01) |
| *G06F 21/55* | (2013.01) |
| *G06F 9/30* | (2006.01) |

(52) U.S. Cl.
CPC ........ *G06F 15/8007* (2013.01); *G06F 9/3836* (2013.01); *G06F 21/558* (2013.01); *G06F 21/60* (2013.01); *G06F 9/3001* (2013.01)

(58) Field of Classification Search
CPC ............................. G06F 9/3001; G06F 9/3836
See application file for complete search history.

(56) References Cited

U.S. PATENT DOCUMENTS

| | | | | |
|---|---|---|---|---|
| 8,781,111 | B2 * | 7/2014 | Qi | ........................... G06F 7/723 380/255 |
| 2005/0271202 | A1 * | 12/2005 | Shu | ........................ G06F 9/3001 380/29 |
| 2011/0154110 | A1 * | 6/2011 | Letz | .................... G06F 17/5022 714/33 |

* cited by examiner

*Primary Examiner* — Zachary K Huson
(74) *Attorney, Agent, or Firm* — Viering, Jentschura & Partner mbB

(57) ABSTRACT

In various embodiments an arithmetic logical unit array is provided, which may include: at least two data registers for storing data, a plurality of fixed instruction registers for storing machine code instructions, and at least one programmable instruction register for storing instruction data being representative for a machine code instruction. A selection circuit of the arithmetic logical unit array may be configured to select one of the machine code instructions from the fixed instruction registers or the machine code instruction represented by the instruction data. An arithmetic logical unit of the arithmetic logical unit array may be configured to apply an operation in accordance with the machine code instruction selected by the selection circuit to the data stored in the data registers.

19 Claims, 2 Drawing Sheets

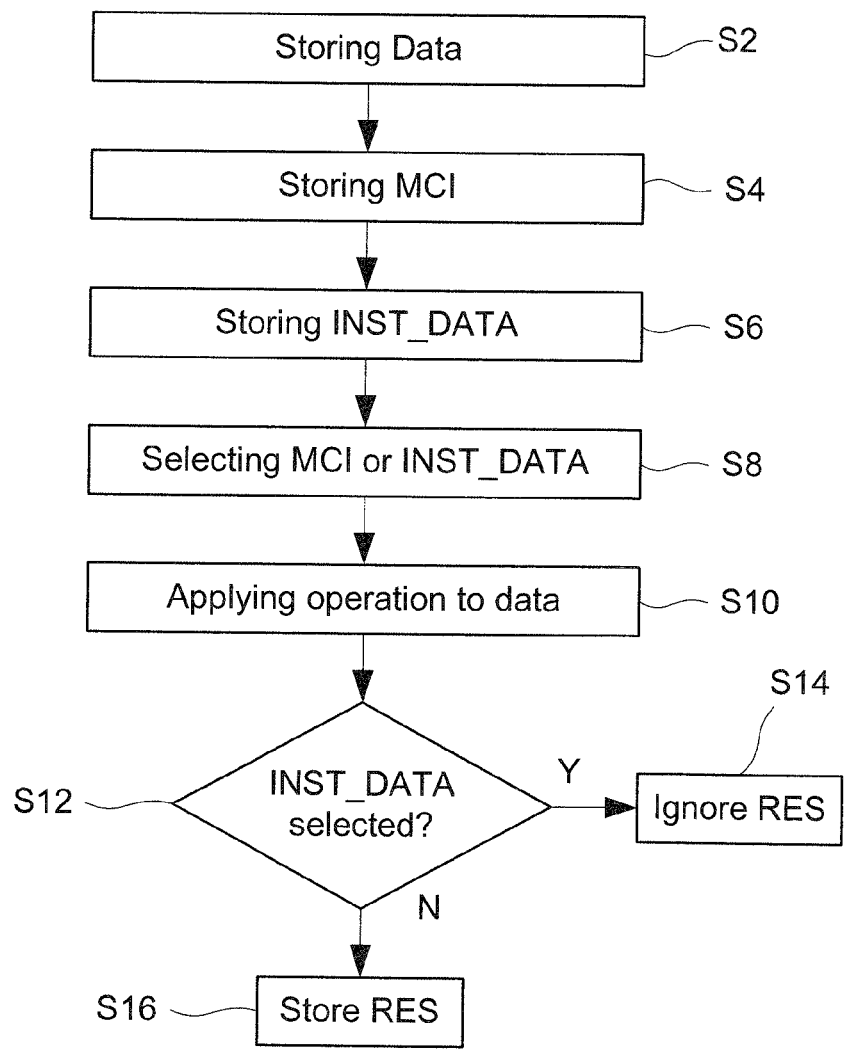

ARITHMETIC LOGICAL UNIT ARRAY, MICROPROCESSOR, AND METHOD FOR DRIVING AN ARITHMETIC LOGICAL UNIT ARRAY

TECHNICAL FIELD

Various embodiments relate generally to an arithmetic logical unit array, to a microprocessor including the arithmetic logical unit array, and to a method for driving an arithmetic logical unit array.

BACKGROUND

A conventional microprocessor includes an arithmetic logical unit array having a plurality of data registers for storing data, a plurality of fixed instruction registers for storing machine code instructions, and an arithmetic logical unit. The arithmetic logical unit applies an operation in accordance with one of the machine code instructions to the data stored in the data registers.

Each operation corresponding to a machine code instruction usually has a typical energy profile when executed so that monitoring the energy consumption of the arithmetic logical unit may make it possible to derive a conclusion regarding the executed operations and thus regarding the machine code instructions which have been carried out and consecutively regarding the source code executed by the microprocessor and/or regarding the internal functionality of the microprocessor. Thus, the security of the microprocessor may be breached.

SUMMARY

In various embodiments an arithmetic logical unit (ALU)-array is provided. The ALU-array may include at least two data registers for storing data, a plurality of fixed instruction registers for storing machine code instructions, and at least one programmable instruction register for storing instruction data being representative for a machine code instruction. A selection circuit of the ALU-array may be configured to select one of the machine code instructions from the fixed instruction registers or the machine code instruction represented by the instruction data. An arithmetic logical unit (ALU) of the ALU-array may be configured to apply an operation in accordance with the machine code instruction selected by the selection circuit to the data stored in the data registers.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a flowchart of a method for driving an arithmetic logical unit array in accordance with various embodiments.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
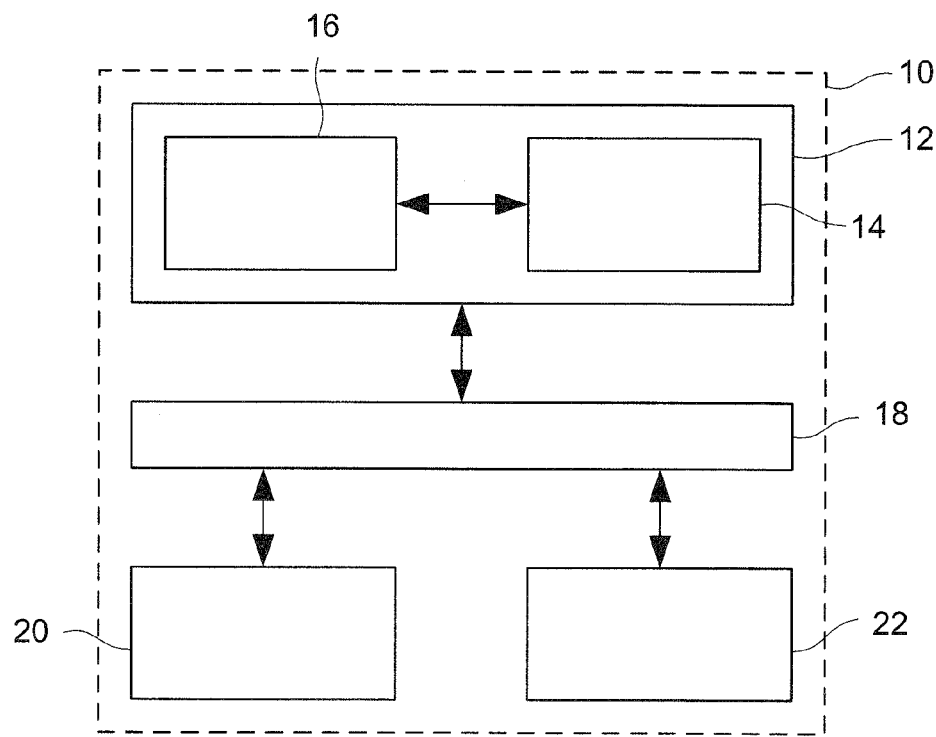
FIG. 1 shows a computer system in accordance with various embodiments.

FIG. 1 shows a computer system 10 in accordance with various embodiments. The computer system may include a microprocessor 12 having a controller (e.g. a control unit, CU) 14 and an arithmetic logical unit array 16 (ALU-array). The computer system 10 may further include a bus 18, an I/O-interface 20, and a memory 22. The microprocessor 12 may be configured to communicate with the I/O-interface 20 and the memory 22 via the bus 18.

In various embodiments, the computer system 10 may be configured as or may include a personal computer, a workstation, a laptop, a notebook, a personal digital assistant (PDA), a radio telephone (e.g. a wireless radio telephone or a mobile radio telephone), a camera (e.g. an analog camera or a digital camera), a chipcard, or another device having a processor (such as e.g. a household appliance (such as e.g. a washing machine, a dishwashing machine, etc.)).

In various embodiments, the microprocessor 12 may be a programmable processor such as e.g. a CISC (complex instruction set computer) microprocessor or a RISC (reduced instruction set computer) microprocessor. The microprocessor 12 may include a central processing unit (CPU), also referred to as a central processor unit. The microprocessor 12 may be understood as the hardware within the computer system 10 that carries out the instructions of a computer program by performing basic arithmetical, logical, and input/output operations of the computer system 10. The arithmetic logical unit array 16 may be configured to perform arithmetic and logical operations. The controller 14 may be configured to extract instructions from the memory 22 and to decode and execute them, calling on the arithmetic logical unit array 16 when necessary.

The controller 14, also referred to as an execution unit or a functional unit, may be configured to perform the operations and calculations. It may have its own internal control sequence unit (not shown), some registers (not shown), and other internal units and/or some smaller, more specific components.

In addition, the computer system 10 may include one or more multiple parallel controllers 14.

The arithmetic logical unit array 16 may be a digital circuit that may be configured to perform integer arithmetic and logical operations. The arithmetic logical unit array 16 may be a building block of the microprocessor 12 of the computer system 10.

In various embodiments, the memory 22 may include one or a plurality of computer arrangement-internal random access memories (RAM), e.g. one or a plurality of computer arrangement-internal dynamic random access memories (DRAM), in which for example data to be processed may be stored. Furthermore, the computer system 10 may include one or a plurality of computer arrangement-internal read only memories (ROM), in which for example the program code may be stored, which should be executed by the microprocessor 12. Furthermore, the computer system 10 may include one or a plurality of computer arrangement-internal electrically erasable programmable read-only memory (EEPROM), in which for example the user data may be stored, to which a plurality of operations may be applied by the microprocessor 10.

In various embodiments, the I/O-interface 20 may include one or a plurality of input/output interfaces configured to connect one or a plurality of computer arrangement-external devices (such as e.g. an additional memory, one or a plurality of communication devices, one or a plurality of additional processors) to the computer system 10. In case the computer system 10 is configured as a chipcard, the I/O-interface 20 may include a plurality of contacts and/or interfaces for receiving energy, a clock signal, a control signal, and/or for exchanging data, for example electrical contacts for a direct galvanic contact and/or one or more coils for an inductive data and/or energy transfer, for example a coil-on-module and/or a booster antenna.

The input/output interfaces may be implemented as analog interfaces and/or as digital interfaces. The input/output interfaces may be implemented as serial interfaces and/or as parallel interfaces. The input/output interfaces may be implemented as one or a plurality of circuits, which implements or implement a respective communication protocol stack in its functionality in accordance with the communication protocol which is respectively used for data transmission. Each of the input/output interfaces may be configured in accordance with any desired communication protocol. In various embodiments, each of the input/output interfaces may be implemented in accordance with one of the following communication protocols:

- an ad hoc communication protocol such as e.g. Firewire or Bluetooth;
- a communication protocol for a serial data transmission such as e.g. RS-232, Universal Serial Bus (USB) (e.g. USB 1.0, USB 1.1, USB 2.0, USB 3.0);
- any other desired communication protocol such as e.g. Infrared Data Association (IrDA).

In various embodiments, one input/output interface may be a USB interface (in alternative embodiments, one input/output interface may be configured in accordance with any other communication protocol such as e.g. in accordance with a communication protocol which has been described above).

In various embodiments, the computer system 10 may optionally include an additional digital signal processor (DSP) (not shown), which may be provided e.g. for digital signal processing. Furthermore, the computer system 10 may include one or more additional communication modules (not shown) such as e.g. one or a plurality of transmitters, one or a plurality of receivers, one or a plurality of antennas, and so on.

In various embodiments, some or all of the circuits or components provided in the computer system 10 may be coupled with each other by means of one or a plurality of computer arrangement-internal connections, for example by means of the bus 18, configured to transmit data and/or control signals between the respectively coupled circuits or components.

Furthermore, as has been described above, the computer system 10, in accordance with various embodiments, may include the memory 22 which may for example include a memory cell arrangement.

The memory cell arrangement may in various embodiments be configured as an integrated circuit. The memory cell arrangement may further be provided in a memory module having a plurality of integrated circuits, wherein at least one integrated circuit of the plurality of integrated circuits includes the memory cell arrangement, as will be described in more detail below. The memory module may be a stackable memory module, wherein some of the integrated circuits may be stacked one above the other. In various embodiments, the memory cell arrangement is configured as a memory card or a flash memory.

In various embodiments, the memory cell arrangement of the memory 22 may include a memory cell arrangement controller (for example implemented by means of hard wired logic and/or by means of one or a plurality of programmable processors, e.g. by means of one or a plurality of programmable processors such as e.g. one or a plurality of programmable microprocessors (e.g. CISC (complex instruction set computer) microprocessor(s) or RISC (reduced instruction set computer) microprocessor(s)).

The memory 22 may further include a plurality of memory cells. In various embodiments, the memory cell arrangement controller may be coupled with the memory cells by means of various connections. Each of the connections may include one or a plurality of lines and may thus have a bus width of one or a plurality of bits. Thus, by way of example, the memory cell arrangement may include an address bus by means of which one or a plurality of addresses of one or a plurality of memory cells may be provided by the memory cell arrangement controller to the memory, on which an operation (e.g. an erase operation, a write operation, a read operation, an erase verify operation, or a write verify operation, etc.) should be carried out. Furthermore, a data write connection may be provided by means of which the information to be written into the respectively addressed memory cell may be supplied by the memory cell arrangement controller to the memory cells. Furthermore, a data read connection may be provided, by means of which the information stored in the respectively addressed memory cell may be read out of the memory cells and may be supplied from the memory cells to the memory cell arrangement controller and via the memory cell arrangement controller to the microprocessor 12, or, alternatively, directly to the microprocessor 12. A bidirectional control/state connection may be used for providing control signals from the memory cell arrangement controller to the memory cells or for supplying state signals representing the state of the memory cells from the memory cells to the memory cell arrangement controller.

In various embodiments, the memory cell arrangement controller may be coupled to the input/output interface and/or the bus system 18 by means of a communication connection (e.g. by means of a USB communication connection).

In various embodiments, the memory 22 may include one chip or a plurality of chips. Furthermore, the memory cell arrangement controller may be implemented on the same chip (or die) as the memory cells or on a separate chip (or die).

Figure 2:
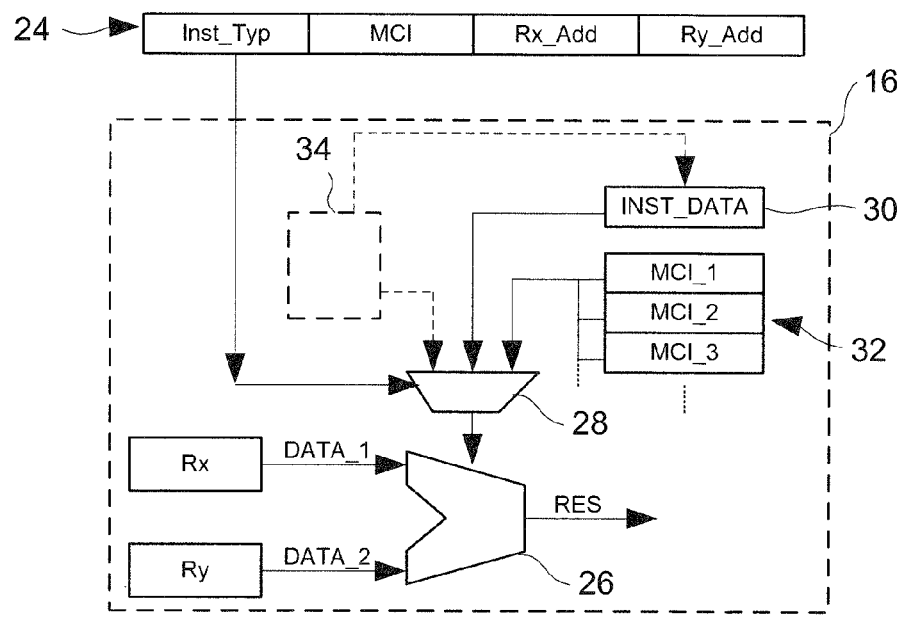
FIG. 2 shows an arithmetic logical unit array in accordance with various embodiments.

FIG. 2 shows an arithmetic logical unit array 16 in accordance with various embodiments. The arithmetic logical unit array 16 may include at least two data registers Rx, Ry configured to store data, e.g. first data DATA_1 and second DATA_2, a plurality of fixed instruction registers 32 configured to store machine code instructions MCI_1, MCI_2, MCI_3, and at least one programmable instruction register 30 configured to store instruction data INST_DATA being representative for a machine code instruction MCI. A selection circuit 28 of the arithmetic logical unit array 16 may be configured to select one of the machine code instructions MCI_1, MCI_2, MCI_3 from the fixed instruction registers 32 or the machine code instruction MCI represented by the instruction data INST_DATA. An arithmetic logical unit (ALU) 26 of the arithmetic logical unit array 16 may be configured to apply an operation in accordance with the machine code instruction MCI selected by the selection circuit 28 to the data DATA_1, DATA_2 stored in the data registers Rx, Ry.

In various embodiments, a data packet 24 sent from the controller 14 to the arithmetic logical unit array 16 may include a plurality of fields, including an instruction type field including an instruction type Inst_Typ of the instruction to be carried out, a pointer field including a pointer to an machine code instruction MCI needed to carry out the instruction, a first address field including a first address Rx_Add of the first data DATA_1 and a second address field including a second address Ry_Add of the second data DATA_2, being subject of a machine code operation.

The selection circuit 28 and the programmable instruction register 30 make it possible to modify an internal functionality of the microprocessor 12. In various embodiments, when executing the machine code instructions MCI in accordance with a source code, sometimes the machine code instruction MCI is applied which is represented by the instruction data INST_DATA and not the machine code instruction MCI which should be applied because of the source code and/or the normal functionality of the microprocessor 12.

The machine code instructions MCI may cause an energy consumption having an energy profile being representative for the source code and/or the functionality of the microprocessor 12. The machine code instructions MCI carried out because of the instruction data INST_DATA may also cause an energy consumption modifying the energy profile generated by carrying out the source code. Thus, an energy profile may be generated which represents a modification of the normal energy profile and which may make it hard or impossible to draw a conclusion regarding the original source code and/or the internal functionality of the microprocessor 12 by monitoring the energy consumption of the microprocessor 12. Thus, the internal functionality of the computer system 10 may be obfuscated by the selection circuit 28 and the programmable instruction register 30.

The fixed instruction register 32 may contain a fixed set of machine code instructions MCI_1, MCI_2, MCI_3. For example, the fixed instruction register 32 may contain $2^n$ different machine code instructions MCI_1, MCI_2, MCI_3. For example, if n=3, the fixed instruction register 32 may contain 8 different machine code instructions MCI_1, MCI_2, MCI_3. The machine code instructions MCI_1, MCI_2, MCI_3 may be stored and/or written once to a respective fixed instruction register 32, for example at the end of a manufacturing process of manufacturing the microprocessor 12.

The programmable instruction register 30 may for example contain one machine code instruction MCI or a link or pointer to a machine code instruction MCI. Further, the machine code instruction MCI or the link or pointer to the machine code instruction MCI in the programmable instruction register 30 may be changed or varied, for example after the manufacturing process of manufacturing the microprocessor 12 is finished, for example during normal operation of the microprocessor 12 and/or the computer system 10.

In various embodiments, the arithmetic logical unit array 16 may include a random number generator 34. The random number generator 34 may be configured to generate and write random instruction data INST_DATA into the programmable instruction register 30. By way of example, every time the machine code instruction MCI represented by the instruction data INST_DATA was carried out, new instruction data INST_DATA may be written into the programmable instruction register 30. The random number generator 34 may thus contribute to randomly modify the energy profile of the microprocessor 12. This may contribute to hide the original source code and/or to obfuscate the internal functionality of the microprocessor 12.

In various embodiments, the random number generator 34 may be configured to generate a random number and the selection circuit 28 may be configured to select the machine code instruction MCI_1, MCI_2, MCI_3 from the fixed instruction registers 32 or the machine code instruction MCI represented by the instruction data INST_DATA depending or based on the random number.

In this case, the instruction data INST_DATA may be maintained over a plurality of executions of the corresponding machine code instruction MCI. Thus, every time the selection circuit 28 chooses to carry out a machine code instruction MCI dependent on the instruction data INST_DATA, the same machine code instruction MCI may be carried out.

Alternatively, the instruction data INST_DATA may be varied over a plurality of executions of the corresponding machine code instruction MCI, for example by the random number generator 34 or another random number generator (not shown). Thus, every time the selection circuit 28 chooses to carry out a machine code instruction MCI dependent on the instruction data INST_DATA, the same or an other machine code instruction MCI may be carried out.

In various embodiments, the instruction data INST_DATA representing the machine code instruction MCI are the machine code instruction MCI. In other words, in various embodiments, in the programmable instruction register 30 at least one machine code instruction may be stored. This may enable to directly load the machine code instruction MCI executed by the ALU 26 from the programmable instruction register 30. The machine code instruction MCI stored in the programmable instruction register 30 may correspond to one of the machine code instructions MCI_1, MCI_2, MCI_3 stored in the fixed instruction register 32. Alternatively, the machine code instruction MCI stored in the programmable instruction register 30 may be another machine code instruction MCI. The latter may enable to easily add a new machine code instruction MCI to the instruction set of the microprocessor 12 by correspondingly programming the programmable instruction register 30.

In various embodiments, the instruction data INST_DATA representing the machine code instruction MCI are representative for a machine code instruction MCI_1, MCI_2, MCI_3 stored in the fixed instruction register 32. For example, the instruction data INST_DATA may be a pointer to one of the machine code instructions MCI_1, MCI_2, MCI_3 stored in the fixed instruction register 32.

In various embodiments, the arithmetic logical unit array 16 may be configured to ignore the result of the operation in accordance with the machine code instruction MCI selected by the selection circuit 28, if the machine code instruction MCI was selected via the instruction data INST_DATA. In other words, the result of the operation in accordance with the machine code instruction MCI selected by the selection circuit 28 is only taken into further consideration, if the machine code instruction MCI was selected from the fixed instruction register 32. This may contribute to that the machine code instruction MCI represented by the instruction data INST_DATA does not disturb the internal functionality of the microprocessor and/or the function of the original source code.

In various embodiments, an arithmetic logical unit array 16 may be provided. The arithmetic logical unit array 16 may include at least two data registers Rx, Ry each storing a data word, e.g. a first data word DATA_1 and a second data word DATA_2, a plurality of instruction registers 32 each storing the machine code instruction MCI_1, MCI_2, MCI_3, and at least one variable instruction register 30 storing an instruction data word INST_DATA being representative for a machine code instruction MCI. The selection circuit 28 of the arithmetic logical unit array 16 may be configured to select one of the machine code instructions MCI_1, MCI_2, MCI_3 stored in the fixed instruction registers 32 or the machine code instruction MCI represented by the instruction data word INST_DATA. The arithmetic logical unit 16 may be configured to execute the machine code instruction MCI, MCI_1, MCI_2, MCI_3 selected by the selection circuit 28 with the data words DATA_1, DATA_2 stored in the data registers Rx, Ry.

Thus, in various embodiments, the data, e.g. the first data DATA_1 and the second data DATA_2, and/or the instruction data INST_DATA may be data words, e.g., the first data word DATA_1, the second word DATA_2, and, respectively the instruction data word INST_DATA. In general, a data word may include a plurality of data bits, for example one data word may include 4, 8, 16, or 32 data bits. The variable instruction register 30 may correspond to the programmable instruction register 30.

In various embodiments, the arithmetic logical unit array 16 may include the random number generator 34 which may be configured to randomly write the instruction data word INST_DATA into the variable instruction register 30.

In various embodiments, the arithmetic logical unit array 16 may be configured such that the selection circuit 34 randomly selects the machine code instruction MCI_1, MCI_2, MCI_3 from the fixed instruction registers 32 or the machine code instruction MCI represented by the instruction data word INST_DATA.

In various embodiments, the instruction data word INST_DATA representing the machine code instruction MCI is the machine code instruction MCI.

In various embodiments, the instruction data word INST_DATA representing the machine code instruction MCI and being stored in the variable instruction register 30 is representative for one of the machine code instructions MCI_1, MCI_2, MCI_3 stored in the fixed instruction register 32.

In various embodiments, the result of the executed machine code instruction MCI, MCI_1, MCI_2, MCI_3 selected by the selection circuit 28 may be ignored, if the machine code instruction MCI was selected via the instruction data INST_DATA.

In various embodiments, a microprocessor including the arithmetic logical unit array 16 may be provided, for example the microprocessor 12 explained above. In various embodiments, a computer system including the microprocessor may be provided, for example the computer system 10 explained above.

FIG. 3 shows a flowchart of a method for driving an arithmetic logical unit array, for example the arithmetic logical unit array 16 explained above, in accordance with various embodiments. The method may for example include: storing data DATA_1, DATA_2 in at least two data registers Rx, Ry (S2), storing machine code instructions MCI_1, MCI_2, MCI_3 in fixed instruction registers 32 (S4), storing instruction data INST_DATA being representative for a machine code instruction MCI in the programmable instruction register 30 (S6), selecting one of the machine code instructions MCI_1, MCI_2, MCI_3 from the fixed instruction registers 32 or the machine code instruction MCI represented by the instruction data INST_DATA (S8), applying an operation in accordance with the selected machine code instruction MCI, MCI_1, MCI_2, MCI_3 to the data DATA_1, DATA_2 stored in the data registers Rx, Ry (S10).

In various embodiments, the method may further include a writing of random instruction data INST_DATA into the programmable instruction register 30, wherein this process may be carried out in S6.

In various embodiments, the method may include generating a random number and selecting the machine code instruction MCI_1, MCI_2, MCI_3 from the fixed instruction registers 32 or the machine code instruction MCI represented by the instruction data INST_DATA depending on the random number, wherein this may be carried out in S8.

In various embodiments, the instruction data INST_DATA representing the machine code instruction MCI may be the machine code instruction MCI.

In various embodiments, the instruction data INST_DATA representing the machine code instruction MCI may be representative for one of the machine code instructions MCI_1, MCI_2, MCI_3 stored in the fixed instruction register 32.

In various embodiments, the result RES of the operation in accordance with the selected machine code instruction MCI, MCI_1, MCI_2, MCI_3 may be ignored (S14), if the machine code instruction MCI was selected via the instruction data INST_DATA. For example, after applying the operation to the stored data DATA_1, DATA_2, it is determined (S12) whether the instruction data INST_DATA were selected in S8 or not. If the condition of S12 is fulfilled, S14 may be carried out and the result RES of S10 may be ignored. In other words, the result RES is not taken into further consideration and/or neglected. If the condition of S12 is not fulfilled, the result RES of S10 is taken into further consideration, and for example is stored, for example for following operations.

In various embodiments, the method for driving the arithmetic logical unit array 16 may include: storing at least two data words DATA_1, DATA_2 (S2), storing a plurality of machine code instructions MCI_1, MCI_2, MCI_3 (S4), storing an instruction data word INST_DATA being representative for a machine code instruction MCI (S6), selecting one of the stored machine code instructions MCI_1, MCI_2, MCI_3 or the machine code instruction MCI represented by the instruction data INST_DATA, and executing the selected machine code instruction MCI, MCI_1, MCI_2, MCI_3 with the stored data words DATA_1, DATA_2.

In various embodiments, in S6, the the instruction data word INST_DATA is randomly set.

In various embodiments, in S8, the stored machine code instruction MCI_1, MCI_2, MCI_3 or the machine code instruction MCI represented by the instruction data word INST_DATA is randomly selected.

In various embodiments, the instruction data word INST_DATA representing the machine code instruction MCI is the corresponding machine code instruction MCI.

In various embodiments, the instruction data word INST_DATA representing the machine code instruction MCI is representative for one of the stored machine code instructions MCI_1, MCI_2, MCI_3.

In various embodiments, the method may include ignoring the result RES of the selected and executed machine code instruction MCI, MCI_1, MCI_2, MCI_3 (S14), if the machine code instruction MCI was selected via the instruction data word INST_DATA. For example, after applying the operation to the stored data word DATA_1, DATA_2, it is determined (S12) whether the instruction data words INST_DATA was selected in step S8 or not. If the condition of step S12 is fulfilled, S14 may be carried out and the result RES of S10 is ignored. In other words, the result RES is not taken into further consideration and/or neglected. If the condition of S12 is not fulfilled, the result RES of S10 is taken into further consideration, and for example is stored, for example for following operations.

In various embodiments, a method for driving a microprocessor 12 including the method for driving the arithmetic logical unit array 16 explained above is provided.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An arithmetic logical unit array, comprising:
at least two data registers for storing data;
a plurality of fixed instruction registers for storing machine code instructions;
at least one programmable instruction register configured to store instruction data being representative for a machine code instruction;
a selection circuit configured to select one of the machine code instruction from the plurality of fixed instruction registers or the machine code instruction represented by the instruction data; and
an arithmetic logical unit configured to apply an operation in accordance with the machine code instruction selected by the selection circuit to the data stored in the data registers.

2. The arithmetic logical unit array of claim 1, further comprising:
a random number generator configured to write random instruction data into the programmable instruction register.

3. The arithmetic logical unit array of claim 1, further comprising:
a random number generator configured to generate a random number;
wherein the selection circuit is configured to select the machine code instruction from the plurality of fixed instruction registers or the machine code instruction represented by the instruction data based on the random number.

4. The arithmetic logical unit array of claim 1, wherein the instruction data representing the machine code instruction are the machine code instruction.

5. The arithmetic logical unit array of claim 1, wherein the instruction data representing the machine code instruction are representative for a machine code instruction stored in a fixed instruction register of the plurality of the fixed instruction registers.

6. The arithmetic logical unit array of claim 1, configured to ignore the result of the operation in accordance with the machine code instruction selected by the selection circuit, if the machine code instruction was selected via the instruction data.

7. A microprocessor, comprising:
an arithmetic logical unit array, comprising:
at least two data registers for storing data;
a plurality of fixed instruction registers for storing machine code instructions;
at least one programmable instruction register configured to store instruction data being representative for a machine code instruction;
a selection circuit configured to select one of the machine code instruction from the plurality of fixed instruction registers or the machine code instruction represented by the instruction data; and
an arithmetic logical unit configured to apply an operation in accordance with the machine code instruction selected by the selection circuit to the data stored in the data registers.

8. A method for driving an arithmetic logical unit array, the method comprising:
storing data in at least two data registers;
storing machine code instructions in fixed instruction registers;
storing instruction data being representative for a machine code instruction in a programmable instruction register;
selecting one of the machine code instructions from the fixed instruction registers or the machine code instruction represented by the instruction data; and
applying an operation in accordance with the selected machine code instruction to the data stored in the data registers.

9. The method of claim 8, further comprising:
writing random instruction data into the programmable instruction register.

10. The method of claim 8, further comprising:
generating a random number; and
selecting the machine code instruction from the fixed instruction registers or the machine code instruction represented by the instruction data based on the random number.

11. The method of claim 8, wherein the instruction data representing the machine code instruction are the machine code instruction.

12. The method of claim 8, wherein the instruction data representing the machine code instruction are representative for a machine code instruction stored in a fixed instruction register of the plurality of fixed instruction registers.

13. The method of claim 8, further comprising:
ignoring the result of the operation in accordance with the selected machine code instruction, if the machine code instruction was selected via the instruction data.

14. An arithmetic logical unit array, comprising:
at least two data registers each storing a data word;
a plurality of instruction registers, each instruction register storing a machine code instruction;
at least one variable instruction register configured to store an instruction data word being representative for a machine code instruction;
a selection circuit configured to select one of the machine code instructions stored in the fixed instruction registers or the machine code instruction represented by the instruction data word; and
an arithmetic logical unit configured to execute the machine code instruction selected by the selection circuit with the data word stored in the data registers.

15. The arithmetic logical unit array of claim 14, further comprising:
a random number generator configured to randomly write the instruction data word into the variable instruction register.

16. The arithmetic logical unit array of claim 14, configured such that the selection circuit randomly selects the machine code instruction from the fixed instruction registers or the machine code instruction represented by the instruction data word.

17. The arithmetic logical unit array of claim 14, wherein the instruction data word representing the machine code instruction is the machine code instruction.

18. The arithmetic logical unit array of claim 14, wherein the instruction data word representing the machine code instruction and being stored in the variable instruction register is representative for a machine code instruction stored in the fixed instruction register.

19. The arithmetic logical unit array of claim 14, wherein the result of the executed machine code instruction selected by the selection circuit is ignored, if the machine code instruction was selected via the instruction data.

* * * * *